United States Patent
Pinkus

(10) Patent No.: US 10,115,264 B2
(45) Date of Patent: Oct. 30, 2018

(54) ENCRYPTED ELECTRONIC GAMING TICKET

(71) Applicant: Lazlo 326 LLC, Jacksonville, FL (US)

(72) Inventor: Michael C Pinkus, Duluth, GA (US)

(73) Assignee: LAZLO 326, LLC, Jacksonville, FL (US)

(*) Notice: Subject to any disclaimer, the term of this patent is extended or adjusted under 35 U.S.C. 154(b) by 344 days.

(21) Appl. No.: 14/612,916

(22) Filed: Feb. 3, 2015

(65) Prior Publication Data
US 2015/0339886 A1 Nov. 26, 2015

Related U.S. Application Data

(60) Provisional application No. 62/003,013, filed on May 26, 2014.

(51) Int. Cl.
A63F 13/00 (2014.01)
G07F 17/32 (2006.01)
A63F 3/06 (2006.01)

(52) U.S. Cl.
CPC ........ *G07F 17/3241* (2013.01); *A63F 3/0665* (2013.01); *G07F 17/3218* (2013.01); *G07F 17/3251* (2013.01); *G07F 17/329* (2013.01)

(58) Field of Classification Search
CPC ............. G07F 17/3218; G07F 17/3241; G07F 17/3251; G07F 17/329
See application file for complete search history.

(56) References Cited

U.S. PATENT DOCUMENTS

| | | | |
|---|---|---|---|
| 5,621,797 A | 4/1997 | Rosen | |
| 6,011,849 A | 1/2000 | Orrin | |
| 6,748,362 B1 * | 6/2004 | Meyer | G06T 1/0035 382/251 |
| 7,252,222 B2 | 8/2007 | Finnerty et al. | |
| 7,364,091 B2 | 4/2008 | Streeter | |
| 7,780,522 B2 | 8/2010 | Lutnick et al. | |
| 7,837,117 B2 | 11/2010 | Finnerty et al. | |
| 8,062,116 B2 | 11/2011 | Lutnick et al. | |

(Continued)

FOREIGN PATENT DOCUMENTS

WO WO 2009087494 7/2009

OTHER PUBLICATIONS

International Search Report dated Aug. 18, 2015.
(Continued)

*Primary Examiner* — Justin Myhr
(74) *Attorney, Agent, or Firm* — Baker Donelson; Dorian B. Kennedy

(57) ABSTRACT

An electronic ticket (30) is disclosed which includes a date of purchase (31), a ticket identifier (32), wager attributes (33), a draw identifier (35), a draw date (36), draw numbers (37), an authority authorized retail identifier (38), and an authority authorized retail terminal identifier (39). The electronic ticket (30) may be a displayed version of an image file, or other electronic file type, which is stored and displayed upon a mobile computer device (50). The image file creates a matrix of pixels which together form a picture including text which form the electronic ticket. The image pixels are manipulated by steganographic techniques, to encode various attributes, including the manipulation of the least significant digits of the numeric value of the pixel color.

24 Claims, 5 Drawing Sheets

(56) References Cited

U.S. PATENT DOCUMENTS

| | | | |
|---|---|---|---|
| 8,177,136 B2 | 5/2012 | Finnerty et al. | |
| 8,758,111 B2 | 6/2014 | Lutnick | |
| 2002/0035687 A1* | 3/2002 | Skantze | H04L 9/0825 713/168 |
| 2002/0111210 A1* | 8/2002 | Luciano, Jr. | G06Q 30/02 463/29 |
| 2003/0104857 A1* | 6/2003 | Jenkins | G06Q 30/02 463/17 |
| 2003/0134672 A1* | 7/2003 | Fulton | G07F 17/32 463/17 |
| 2003/0162591 A1* | 8/2003 | Nguyen | G07C 9/00031 463/29 |
| 2003/0168510 A1* | 9/2003 | Allen | G06Q 20/28 235/380 |
| 2003/0215151 A1* | 11/2003 | Bezryadin | G06T 7/13 382/240 |
| 2005/0070257 A1 | 3/2005 | Saarinen et al. | |
| 2005/0124408 A1* | 6/2005 | Vlazny | G06Q 20/363 463/28 |
| 2008/0167106 A1 | 7/2008 | Lutnick et al. | |
| 2010/0253063 A1 | 10/2010 | Skogster | |
| 2010/0299747 A1 | 11/2010 | Hamilton, II et al. | |
| 2013/0077817 A1 | 3/2013 | Naparstek et al. | |
| 2013/0166686 A1 | 6/2013 | Omar | |
| 2013/0260857 A1 | 10/2013 | Nordby et al. | |
| 2013/0316774 A1 | 11/2013 | Lutnick et al. | |
| 2014/0011561 A1 | 1/2014 | Lutnick et al. | |
| 2014/0126766 A1 | 5/2014 | Crisan et al. | |

OTHER PUBLICATIONS

Written Opinion of the International Searching Authority dated Aug. 18, 2015.
Anonymous: "Non-repudiation—Wikipedia", Apr. 17, 2014 (Apr. 17, 2014), XP055410366, Retrieved from the Internet: URL:https://en.wikipedia.org/w/index.php?title=Non repudiation&oldid=604539968 [retrieved on Sep. 27, 2017] * p. 1 *.
Supplementary European Search Report dated Sep. 28, 2017 for EP Application No. 15800108.1.

* cited by examiner

ENCRYPTED ELECTRONIC GAMING TICKET

CROSS REFERENCE TO RELATED APPLICATION

Applicant claims the benefit of U.S. Provisional Patent Application Ser. No. 62/003,013 filed May 26, 2014 and entitled System and Method For Electronic Lottery Ticket Distribution and Validation

TECHNICAL FIELD

This invention relates generally to gaming tickets, and specifically to electronic gaming tickets.

BACKGROUND OF THE INVENTION

Gaming tickets have existed for decades. A gaming ticket may include any type of wager placed upon a sporting event, game of chance, or other wage type play. One of the most common types of such gaming ticket is a lottery ticket. Conventional lottery tickets rely on the printing of wager information on a piece of paper. The wager information may include the game, draw and wager attributes along with a unique ticket identifier which allows for the validation of the ticket by the issuing authority. Wager attributes may include numbers or letters or symbols from pools of the same. Paper tickets are usually printed only after an electronic audit transaction has recorded the wager information. These paper tickets are typically anonymous bearer documents with no indication of ownership other than its physical possession as an outcome of their purchase or legal transfer. To claim a prize associated with the wager information one simply presents the ticket to the issuing authority or its proxy for validation of its document authenticity, recorded audit trail and match of its wager attributes to issuing authority declared award validation attributes.

The paper ticket is a bearer document which the issuing authority will validate, upon presentation by a claimant, as a condition of and prior to awarding a prize. Validation entails several steps. First, the tickets medium (paper) is checked to determine if it matches that of the issuing authority. Second, the wager information printed on the claimant ticket matches the game award rules required to award a prize. Third, a unique ticket identifier printed on the ticket is matched to the unique ticket identifier recorded in the audit records of the issuing authority. Extensive effort is made to verify that only the unique ticket identities issued by the authority are claimed. This often includes duplicate and independent audit controls to record wager information by the issuing authority.

A paper ticket matching the game award rules required to award a prize can be physically counterfeited in many ways including, but not limited to, using valid authority paper stock and valid authority printing equipment. This physical counterfeiting method is mitigated by the authority securely maintaining the recorded wager information in the authority system which will tell them if a uniquely identified ticket was in fact authorized for printing. Thus, the paper ticket is not the sole means of authenticity. Authenticity is the physical possession of a valid bearer document medium printed with valid wager information matching recorded wager information in an authority system.

Counterfeiting a ticket would thus require not only printing on a valid bearer document medium, but also manipulating the internal issuing authorities' computer system(s) and one or more independent control system(s) to record an electronic audit transaction with a unique ticket identifier that matches the printed (counterfeit) ticket.

However, counterfeiting by creating a duplicate ticket (a second ticket which has the exact same attributes of the first or original ticket) may be accomplished with less effort. If the printed wager information on a ticket is known, such as by the winner posting a photograph of the ticket on a public forum, the use of valid authority bearer document medium and valid authority printing equipment may allow a physical duplicate to be created that was indistinguishable from the original as far as claim validation is concerned. In this case, the first claimant to present the ticket may be validated as authentic.

Notwithstanding the possibility of counterfeiting, the bearer nature of the ticket is highly desirable by prize claimants as it allows, among many reasons, the claimants to remain anonymous in their wagering history prior to claim of a winning ticket, determine the appropriate or desired apportionment of the prize amounts to individual or corporate structures and determine the appropriate or desired geographic residence from which to claim the ticket for reasons such as tax advantage.

The critical attributes of a paper ticket are that the ticket is a bearer document such that prior to claim, the actual bearer whom is currently in possession is not identifiable through information printed on or electronically associated with the ticket nor is the bearers wagering history discernable through the bearers' possession of any one ticket. Thus, the bearer is awarded a prize so long as a valid ticket is validly issued by the authority with valid wager information matching the game award rules required to award a prize.

The recent advent of ubiquitous internet connectivity and specifically internet connected mobile devices and the mobile applications (apps) running on them has allowed many traditional paper based products to migrate to an electronic version of the basic product such as coupons and loyalty cards. Tickets, including those for lottery and other types of wagering, however, have not achieved this more convenient electronic product format due to the impractical nature of satisfying the critical attributes of the product.

Current electronic lottery ticket systems, including internet based systems, require non-anonymous transactions where the player is required to identify themselves and pay or pre-pay for the tickets under that identity. Players are hesitant to identify themselves prior to claim, provide sensitive financial information or have their wagering history stored by states or private parties and prefer to retain the critical attributes of a paper ticket.

It would be desirable to provide tickets for lottery and other types of wagering in an electronic format, acting as an electronic bearer instrument, that would retain the critical attributes of a paper ticket while eliminating the need for paper as a ticket medium.

It would further be desirable to allow an electronic ticket to be purchased and born by a player in a substantially similar manner as the paper ticket, yet have a behavior similar to that of a paper ticket so that people feel comfortable with their use.

It would further be desirable to have the electronic ticket provide for player anonymity as a bearer instrument.

It would further be desirable to have the electronic ticket provide for storage of player credentials such that player claim rights are protected by player reproducible information contained only within the electronic ticket and discoverable by the issuing authority at the time of claim.

It would further be desirable to have the electronic ticket provide for a group wagering means such that multiple players could add credentials to a common electronic ticket and be protected in their shared claim rights by both shared possession of the electronic ticket as well as a means to individually and/or collectively prove claim validity.

It would further be desirable to have the electronic ticket provide for a group wagering means such that multiple players could indicate apportionment of prize award at the time of purchase to avoid disagreement at the time of claim.

It thus is seen that a need has long existed for an electronic gaming ticket which is an anonymous, secure bearer instrument verifiable by the issuing authority. Accordingly, it is to the provision of such that this invention is primarily directed.

SUMMARY OF THE INVENTION

An electronic bearer instrument comprises an electronic file containing a humanly detectable first data set and a humanly undetectable second dataset. The humanly undetectable second dataset containing wager information selected by or for a claimant and encrypted using a cryptographic key. The second dataset also being encoded into the humanly detectable first dataset.

DETAILED DESCRIPTION

Figure 1:
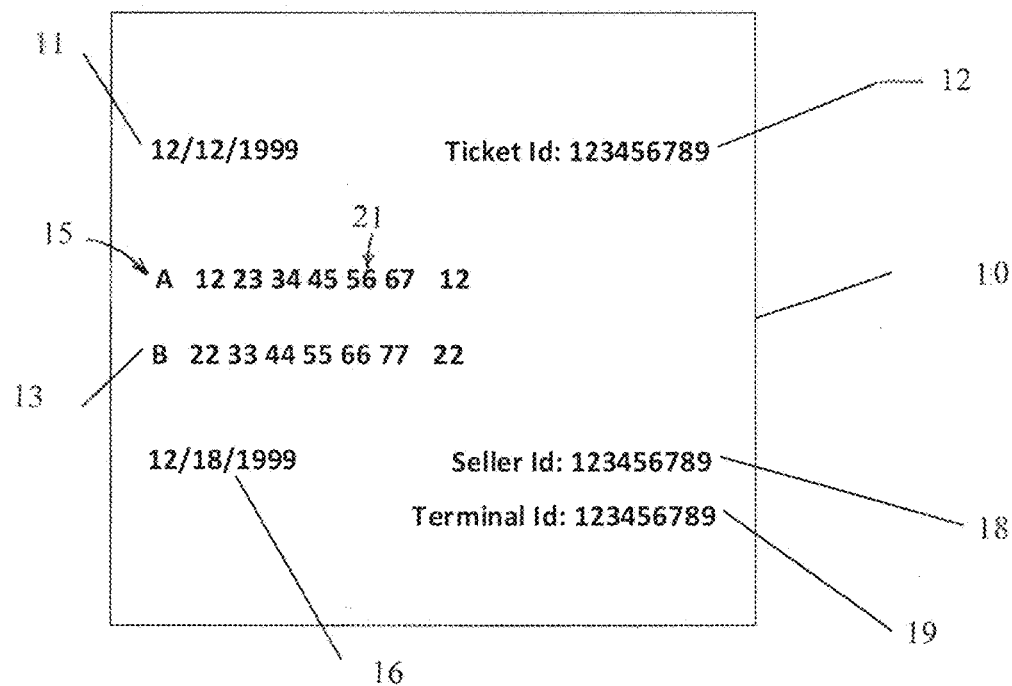
FIG. 1 is a schematic view of a conventional paper lottery ticket of the prior art.

With reference next to the drawings, there is shown a system and method of producing and verifying an electronic bearer instrument, in the form of electronic tickets, in a preferred form of the invention. FIG. 1 shows a conventional paper gaming ticket 10 in the form of a lottery ticket. The lottery ticket 10 is imprinted with the date of purchase 11, a unique ticket identifier 12, an award validation attributes 13 which usually describe the game identifier, the draw identifier 15, a draw date 16, and the numbers 17 or other attributes of the wager. The draw date 16 identifies the date upon which the winning numbers are selected and subsequently validated or claimed. The ticket may also include an authority authorized retail identifier 18 and an authority authorized retail terminal identifier 19 which provides additional validation attributes which identify the location and exact terminal used at that location for the purchase of the ticket.

The award validation attributes 13 contain information such as the numbers 17 within a range in one or more sets that match the game rules for a specific game. An example of game rules might be that the top prize is awarded to a claimant when the wager attributes on a ticket matches entirely, the award validation attributes picked at random as a result of a draw. If the tickets wager attributes are numbers and are 12, 23, 34, 45, 56, 67 and 12 and the draw winning award validation attributes are numbers and are 12, 23, 34, 45, 56, 67 and 12 then a prize for the draw is awarded to the claimant possessing the matching wager attributes.

Figure 2:
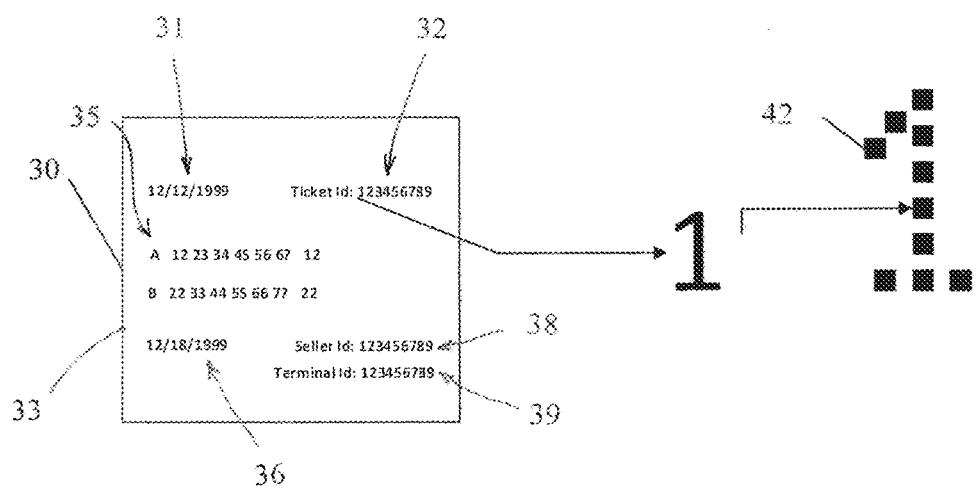
FIG. 2 is a schematic view of an electronic lottery ticket of the present invention.
Figure 3:
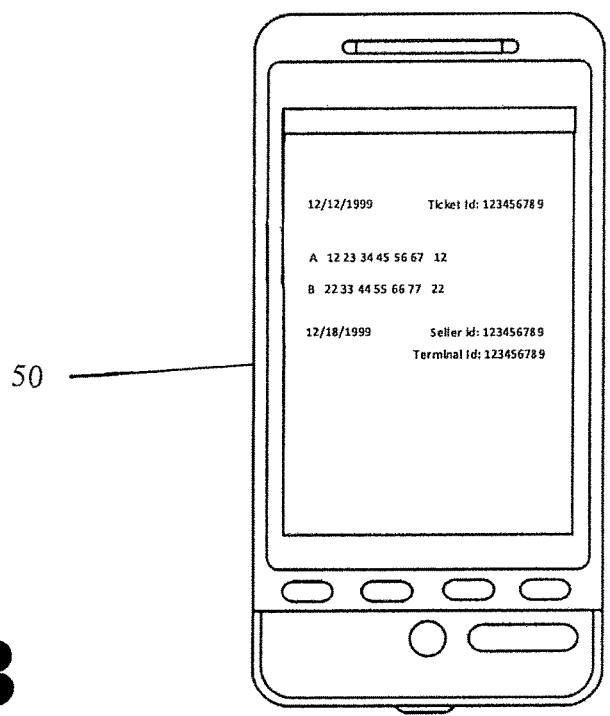
FIG. 3 is a schematic view of the electronic lottery ticket of FIG. 2 shown on a smart phone.
Figure 4:
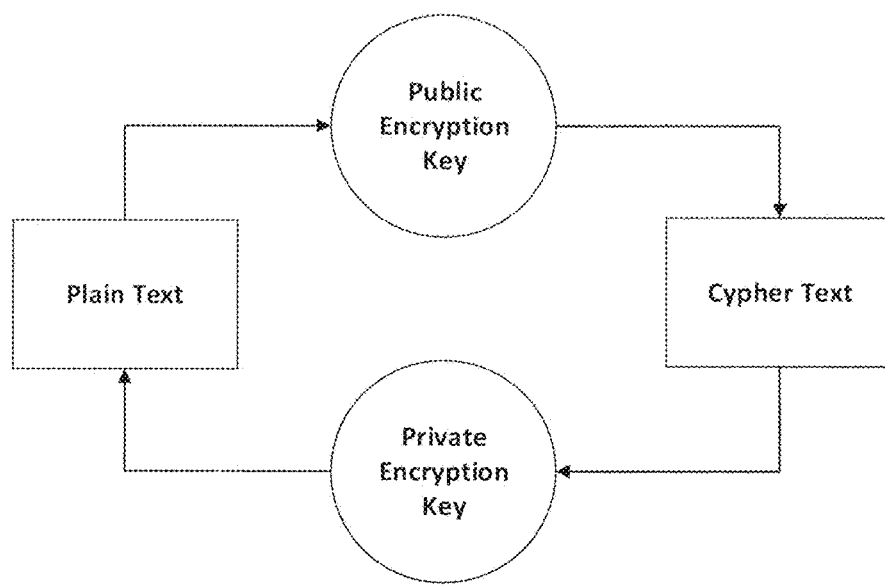
FIG. 4 is a schematic view of an encryption cycle used for the electronic lottery ticket of FIG. 2.

FIG. 2 shows an electronic ticket 30, in a preferred form of the invention that may be any type of ticket even though the ticket described in detail herein is in the form of a gaming ticket and specifically to a gaming ticket in the form of a lottery ticket. As used herein, the term ticket is meant to represent any type of bearer instrument such as, but not limited to, a lottery ticket, a gambling ticket, a bond, a stock certificate, or coupon. Similar to the conventional paper ticket shown in FIG. 1, the electronic ticket 30 includes a date of purchase 31, a ticket identifier 32, award validation attributes 33, a draw identifier 35, a draw date 36, draw numbers 37, an authority authorized retail identifier 38, and an authority authorized retail terminal identifier 39.

As described in more detail hereinafter, the electronic ticket 30 is a displayed version of an image file which is stored and displayed upon a mobile computer device 50 and in one embodiment, designed to resemble a conventional paper lottery ticket. The mobile computer device 50 may be a smart phone, tablet, laptop computer, PDA, or any other similar device. The image file creates a matrix of pixels which together form an image or picture and text which form the electronic ticket. FIG. 2A shows a portion of the matrix of pixels which create the first digit of a ticket identifier 32, wherein each pixel 42 creating the first digit (shown as 1) is shown as a single square. The image pixels are manipulated by steganography techniques to encode the image through manipulation of the least significant digits of the numeric value of the pixel color as explained in more detail hereinafter.

The method and system of this invention centers on the innovative concept of generating an electronic ticket in the form of an electronic file (first dataset), such as, but not limited to, an image file in a format such as the portable network graphic (mime type of image/png) encoded with a payload (second dataset) using steganography techniques. The payload includes a content cypher text string, which has been encrypted using a symmetric key and a symmetric key cypher text string which was used to symmetrically encrypt the content plain text string and has been encrypted using an authority or game or draw specific asymmetric public key. The content cypher text string contains the symmetrically encrypted content plain text string which contains the wager attributes 33, a unique ticket identifier 32 and optionally, individual or group claimant authentication information such as, but not limited to, a pin or password cryptographic hash or one or more cryptographic hashes of files in possession of the player, such that the resulting electronic file possesses the critical attributes of a ticket, can be stored on any electronic storage medium and can be transmitted using any lossless digital transmission method.

The method and system may provide a central system to persist and retrieve various information required for game management play such as authority information, game information, draw information, retailer information and other similar information. The system may also be used for wager management with information such as ticket serial numbers and specific game, draw, panel, component options selected by the player. The central system could be hosted on premise upon servers or cloud based hosted on virtual instances of computing resources such as to services, databases, queues, file storage, internet web servers and other associated resources.

The following description references a lottery game as one embodiment of the invention. The system is typically utilized by a player with a mobile phone, tablet, or device executing an application or claimant software stored upon the claimants device. These devices includes an ios, android, windows phone or other operating systems which allows the device to select one or more lottery games that have been stored in the game management system. The player selects one or more draws and one or more panels per draw and selects component options from pools either manually or through system selection by pseudorandom algorithm, i.e., the player selects their own numbers or an automatic selection of numbers through a quick pick type algorithm. As an option, the player or group of players can provide credentials to be stored in the encrypted payload to allow various levels of authentication of the player upon claim.

The credentials stored in the encrypted payload that is encoded into the ticket file and during the claiming process may include a cryptographically hashed pin (personal identification number) remembered by the player and presentable to cryptographically hash as validation of the pin; a cryptographically hashed password remembered by the player and presentable to cryptographically hash as validation of the password; a cryptographic hash of a file possessed by the player and presentable to cryptographically hash as validation of the image; a voice print provided by the player and reproducible as validation of the voice; a finger print provided by the player and reproducible as validation of the finger print; or other reproducible credential items which do not identify the player in the form that is stored in the payload.

The game, draw and panel selections are stored, prior to checkout, in a shopping cart list. The player can choose to save the selections, in a favorites list, to be used in future transactions. When ready to wager, the player selects checkout to start the payment process. When a player app enters checkout mode, the player app displays a waiting state indicator to indicate that a payment process is occurring with an indeterminate processing period.

Alternatively, the method and system could provide the player a web page or text messaging dialog that allows them to select or communicate the selection of one or more games that have been stored in the game management system. The player then selects or communicates selection one or more draws and one or more panels per draw and selects or communicates selection of component options from pools either manually or through system selection by pseudorandom algorithm (quick pick). In this embodiment, the player could provide an email address or text address to which the final generated electronic file is sent after payment is recorded. As the final electronic file may be sent to the app on the device, to an email address, to a text message, or any other electronic storage means, the term claimant file storage system may be used herein as any of these means or similar file storage system.

The system may include a means for the player app to determine the location of the player though various means such as iBeacon or other Bluetooth low energy beacon, gps, glonass, wifi, audio triangulation or other means and transmits same to the shopping system upon the player app entering checkout mode. If the shopping system determines the player is within the boundaries of an authority authorized retailer location it notifies the player to proceed to a point of sale location, such as a point of sale clerk or a point of sale kiosk. The player app displays a unique code and/or broadcasts a unique code through various means of short range methods such as NFC, BLE, wifi, sound, or though pictorial means such as a qr or barcode.

The clerk or kiosk location includes a display or internal list that shows or is aware of the player apps within range based on the unique code in its various formats from the player App. The point of sale system has means to scan or cause to know the various unique code outputs of the player app so as to identify the player device being presented for payment of wagers. The player displays the visual codes to the clerk or the clerk is notified by the point of sale system of the player's device being in proximity to the point of sale system. The system may allow for authority manipulation of the authorized proximity distances that would allow players to initiate checkout and/or complete a sale.

When payment has been made by the player to the clerk or kiosk, the point of sale system records the payment in the shopping management and wager management system(s). As the shopping management system confirms receipt of the payment transaction, the shopping management system sends a payment confirmation to the player app and the point of sale system to indicate that a ticket is being generated. The shopping management and wager management systems communicate so as to persist wager information in the authority storage means. During the ticket generation process, the player app and point of sale system indicates to the player app and the point of sale system that a ticket generation process is occurring with an indeterminate processing period.

The system also provides an authority and/or game and/or draw asymmetric cryptographic public private key pair. The public key is available to the shopping management systems and/or the wager management system and/or other authority systems used to generate the electronic ticket. The private key is guarded and only used by the authority to decrypt a claimed ticket.

The system provides two attributes in the ticket payload, namely a SymetricKeyCypherText and a PayloadCypherText. The SymetricKeyCypherText attribute contains the encrypted symmetric key used to symmetrically encrypt the payload cypher text or portions of the payload cypher text. The symmetric key cipher text is encrypted using the authority and/or game and/or draw asymmetric public key. The PayloadCypherText contains the encrypted content string encrypted using a symmetric algorithm, such as AES, using the decrypted plain text of the SymetricKeyCypherText as the symmetric key.

In generating an electronic ticket, a content string containing the wager attributes, the unique ticket identifier and optionally claimant authentication information (such as a pin or password) is encrypted into cypher text using a symmetric encryption algorithm. The encryption key then being encrypted using an asymmetric public key unique to the game and/or draw.

A file template, for example an image file, can be used as the basis of each electronic ticket. This file template may be an exact graphic representation of the design of a conventionally known printed, paper ticket or may be any interesting file content desired as the basis of the ticket file. By varying the byte configuration of the file and hashing the template prior to creation of the payload and embedding the file template cryptographic hash in the payload it can be further proven, upon decryption of the payload, that a given file was derived from a valid authority file template much like authority authorized paper contains various hints to indicate the validity and origin of the claimed paper ticket.

The ticket template may be dynamically generated to display advertising content which is contextually relevant to the specific player and the attributes of that player in the context of a multiple of conditions. The display advertising content may include players location, time of day or date, proximity to retail product or store location, or other similar attributes. For example, a player located at a gas station may cause the ticket template to include a coupon and related barcode or other identifying information to allow a discount on gas. As way of another example, the central system may sense through the use of location beacon technology within the player app that the player lingered near a certain retail display, therefore this causes the ticket template to include a coupon and related barcode or other identifying information for a discount on the product or products associated with that display.

In generating an electronic ticket, the wager information can be visually or audibly represented when the ticket is produced as in a visual file format such as an image or video files or audibly represented when the ticket is in an audio file format such as mp3 or other audio file formats. By embedding wager information both in the encrypted payload and directly in the visual image or video file or an auditory file, the player can be aware of the player selected wager information but not have access to any secure claim or authentication information contained within the ticket payload.

Steganography may be used with a visual file format to relay information without being visually noticeable. A simple steganography approach, among many possible, is to hide data within an image file, is called the least significant bit (LSB) insertion. In this approach, the system takes the binary representation of the data to be encoded and overwrites the LSB of each byte within a template image (file). If the system utilizes, for example, a 24-bit color, the change to the template image is minimal and indiscernible to the human eye for the first four bits of the byte indicate the color scheme or range which is perceptible to the human eye. The bits appearing after the first four bits provide variations which are not perceptible to the human eye, with each successive bit being less important. Therefore, these trailing bits may be manipulated to indicate or hide information without changing the visual appearance of the pixel associated with the byte. For example, suppose the system has three sequential pixels (nine bytes) (first group of bytes) with the following RGB (red, green, blue) encoding:

| | | |
|---|---|---|
| 10010101 | 00001101 | 11001001 |
| 10010110 | 00001111 | 11001010 |
| 10011111 | 00010000 | 11001011 |

To encode the following 9 bits of information: 101101101 (second group of bytes), the system overlays these nine bits onto the LSB of the nine bytes shown above. As a result, the nine bytes above are converted to the following nine bytes (final group of bytes) (where bits in brackets are shown herein to indicate an overall change).

| | | |
|---|---|---|
| 10010101 | 0000110[0] | 11001001 |
| 1001011[1] | 0000111[0] | 1100101[1] |
| 10011111 | 00010000 | 11001011 |

Thus, the system has encoded nine bits by changing only four of the bits, or approximately half of the LSB bits.

The steganography may commence with the very first byte of a file (image file or audio file) or anywhere within the file. As such, the dataset including wager information and other information may be hidden so as not to be humanly perceivable (humanly undetectable) with or within a dataset including visual or audio data which is perceivable to a human (humanly detectable). It should be understood that depending on the number of bytes utilized in the steganographic technique the image or video quality may degrade, however, the term humanly undetectable or humanly undetectable dataset as used herein is intended to mean that a human cannot readily detect the data under normal conditions or without the aid of electronic means.

In generating an electronic ticket the shopping management system and/or wager management system persists several items to assure that a ticket was generated by an authorized authority retailer, which may include the non-secure ticket unique identifier and the cryptographic hash of the generated ticket file post template modification and post encoding of the encrypted payload. Additional information may be persisted to assure non repudiation of the ticket by both the player and the authority upon claiming by a player which may include a cryptographically hashed globally unique non repudiation string value that is persisted on the central system in cypher text format and within the encrypted ticket payload as a plain text string. The ability for a decrypted ticket payloads cryptographically hashed plain text globally unique non repudiation string value to match the central systems cryptographically hashed globally unique non repudiation string value further proves the authenticity of the ticket being presented for claim.

Content string cypher text is encoded into an instance of the image template file using steganography techniques to yield an electronic ticket file. The final encoded file is cryptographically hashed into cypher text. The cypher text is then asymmetrically signed by a shopping management system private key and the cryptographically hashed signature is stored with the unique ticket identifier by the authority to aid in claim validation. The storage of the signatures cryptographic hash provides a further layer of security by assuring that even a ticket that was generated fraudulently using the correct public keys is still deemed invalid if the signatures cryptographic hash associated with the unique ticket identifier does not exist in the issuing authority audit system(s) prior to close of draw. Much like previously discussed paper ticket counterfeiting options, multiple countermeasures exist in the present invention to assure multiple system(s) would need to be attacked to successfully counterfeit an electronic ticket. The final encoded file is returned to the shopping management system for distribution to the player.

An authority authorized retailer location might be connected to the shopping management system, while the player app is not. The player app may alternatively checkout and download symmetrically encrypted ticket files matching the requested shopping cart to the players' app or possession prior to purchase or being in proximity to the retailer location so as to avoid connectivity issues during the proximity based payment session. Rather than a synchronous ticket generation and download transaction, the ticket may be generated, encrypted and downloaded at any time prior to when payment is requested. The payment could then be completed while in proximity to the point of sale location even if the player app is disconnected. The encrypted file returned to the player app or player possession would then be able to be decrypted by the player app or player using a key provided during the payment process with a connected point of sale. This key could be transmitted electronically, visually or audibly to the player app upon payment validation. This method provides for player app disconnected payment and requires only retailer point of sale connectivity to persist the sale and retrieve the decryption key for the tickets previously downloaded in an encrypted format by the player app. Decryption keys may be transmitted to the disconnected player app by the connected point of sale via electronic, auditory or visual means at the time of purchase.

The electronic ticket content string cypher text can be decoded from the electronic ticket file using the inverse of the steganography techniques used to encode ticket cypher text.

The electronic ticket content string cypher text can be decrypted using the private key matching the public key used to encrypt the content string. The electronic ticket can be authenticated using the claimant authentication information such as a pin or password cryptographic hash comparison.

In the event that there is a single purchaser/claimant, the claimant may provide a pin or password which is cryptographically hashed and compared to the cryptographic hash value stored in the content string at the time of electronic ticket generation.

In the event that there are multiple claimants, such as when tickets are purchased by a group of players, the electronic ticket may be authenticated using shared claimant group authentication information such as a group pin or password which is cryptographically hashed and compared to the cryptographic hash value stored in the content string at the time of electronic ticket generation. The claimant group members may provide an individual pin or password which is cryptographically hashed and compared to the cryptographic hash value stored in the content string at the time of electronic ticket generation.

The system allows for authority authorized retailers to generate electronic tickets in a non-reputable manner. As such, the system provides for the issuing authority a mechanism by which authority authorized retailers can generate an asymmetric cryptographic public and private key pair and provide the asymmetric public key to the issuing authority to prove electronic tickets are generated by the authorized retail through an asymmetric cryptographic digital signature (cryptographic signature). To do so, the electronic ticket cryptographic hash is signed using the asymmetric private key of the authority authorized retail and stored by the issuing authority with the cryptographic hash text and unique ticket identifier. The electronic ticket can then be verified cryptographically during the claim process as being issued by an authority authorized retail. This digital signature may also act as proof of authority authorized retail transactions to facilitate billing and other administrative tasks pertaining to the sale of the electronic ticket. This also optionally provides for an embodiment in which authority authorized retails can generate valid electronic tickets while offline from the authority.

The electronic ticket is verified to indicate it was issued by the authority by presenting the electronic ticket file. The electronic ticket file presented for validation can be cryptographically hashed and the cryptographic hash cypher text looked up by the issuing authority in the issuing authorities audit transactions. Existence of the cryptographic hash text in the issuing authorities audit transactions confirms the issuance of the electronic ticket by that authority.

The system may then check to validate that the electronic ticket was issued by an authority authorized retailer. The electronic tickets unique identifier would be looked up in the issuing authorities audit transactions. Using a digital signature verifying algorithm, the electronic tickets cryptographic hash signature stored in the issuing authorities' audit transactions would be verified as authentic to the authority authorized retailer. If the signature was verified it would indicate that the authority authorized retailer issued the electronic ticket.

The electronic ticket is also validated to indicate the winning status of the electronic ticket based on the rules of the game(s) of the electronic ticket presented for validation as follows. First, the content string cypher text is decoded from the electronic ticket file using the inverse of the steganography techniques used to encode ticket cypher text. Second, the symmetric key cypher text is decrypted using the game and/or draw specific private key. Third, the encrypted content string is decrypted using the symmetric key plain text. Fourth and finally, the unique ticket identifier is validated and the wager attributes of the claimants file are compared to the award validation attributes. If they satisfy the rules for award of the game being presented for validation, the claimant is awarded the prize(s) (authorized payment) associated with the wager attributes for the electronic ticket.

Figure 5:
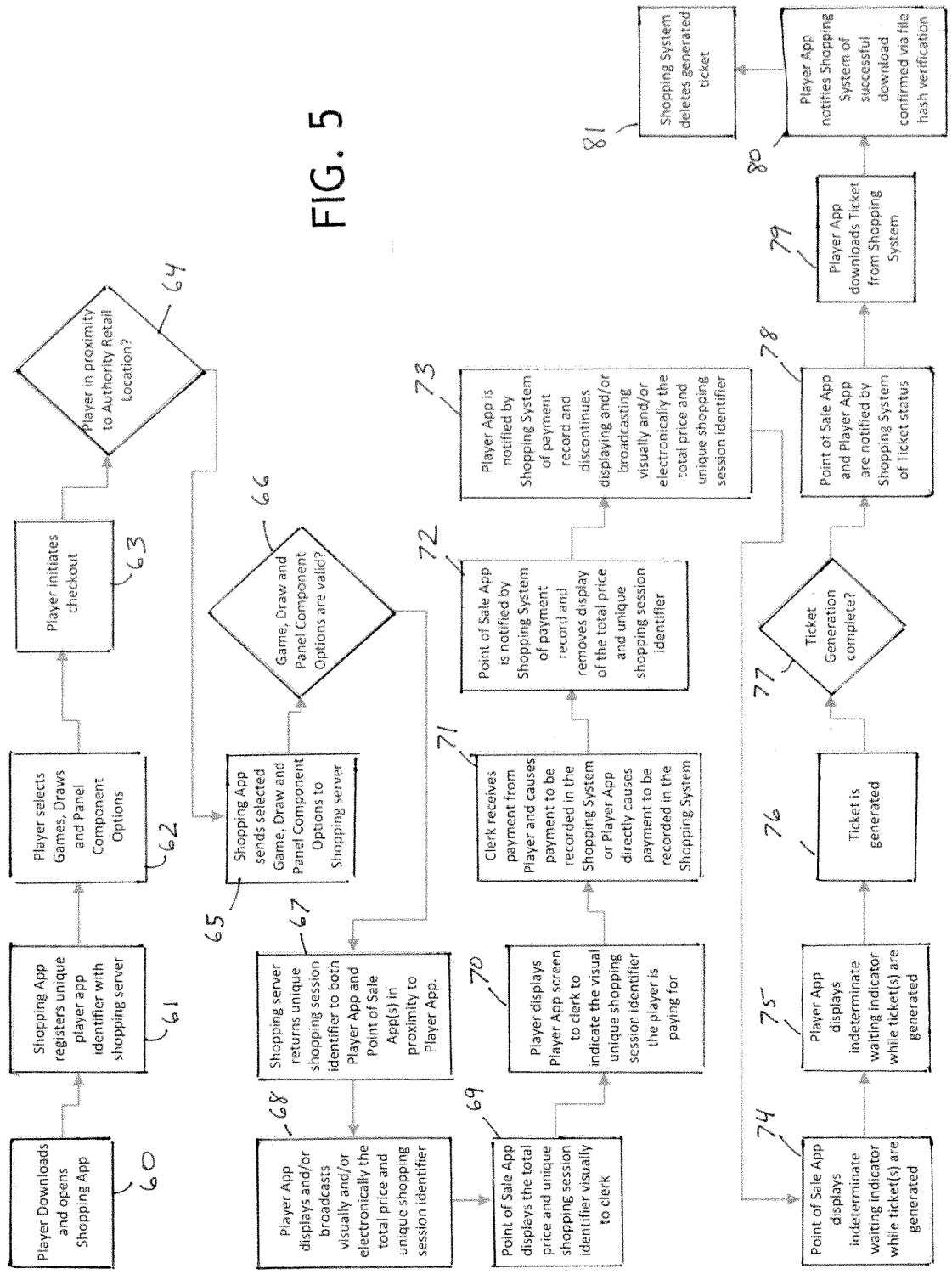
FIG. 5 is a flow chart illustrating the method of encrypting and decrypting the lottery ticket of FIG. 2.

In summary, the system provides a player with the ability to select wager information and purchase a ticket by electronic means. While the process has been described in detail above, the following is a concise summary of the process which is also illustrated in FIG. 5. The player first downloads and opens a ticket shopping app 60. The shopping app registers the player with a unique player app identifier within the shopping server of the central system 61. The player may then select desired game, draw, and panel component options such as numbers 62 and the player initiates a checkout 63. The player must checkout close to an authority authorized retailer location 64 wherein the app electronically relays the game information to the shopping server (central system) 65 which validates the information 66. The shopping server (central system) then returns a unique shopping session identifier to both the player app and the point of sale app which processed the players purchasing of the ticket 67. The player app then displays the price and unique shopping session identifier 68 which is also displayed at the point of sale app 69 so that the clerk may collect the funds to purchase the ticket. With the player displaying the smart phone screen to the point of purchase clerk 70 the clerk receives the payment which is recorded by the shopping system and player app 71. The central system then removes the display from the point of sale app 72 and notification of the payment record is sent to the player app and displayed 73. The point of sale app may then display an intermediate waiting indicator while the ticket is generated 74 which is also displayed on the players' smart phone 75. The central system generates the ticket 76 which when confirmed 77 a notification is sent to the point of sale app and player app 78. The player app then downloads the ticket from the shopping system (central system) 79 and the player app notifies the shopping system of the successful download through a comparison of the shopping systems transmitted file cryptographic hash value and the received files cryptographic hash value 80. The shopping system then may delete the generated ticket 81.

The present invention advances the art of ticketing for lottery and other types of wagering by providing an electronic ticket that possesses the critical attributes of a ticket, which include the following: a means of player selecting panels of component options and paying for them; a means of generating a ticket file based on the player selected panels of component options; a ticket file which is a bearer instrument requiring no registration of player personally identifying data to facilitate claim of a prize; a ticket file presenting visual or auditory information to a player in a common file format such that they can view or hear the game, draw and wager information using common file viewing applications; a ticket file containing an encrypted payload of game, draw, wager and/or player credential information encoded into the ticket file using steganography, cryptographic hashed password credentials, and cryptographically hashed player image cypher text from player stored images; a ticket file, in the form of an image, containing a second image, selected by the player and superimposed on the ticket image to provide one type of player identification; a ticket file, in the form of an image, containing a voice print, created by the player and superimposed on the ticket image to provide one type of player identification; storing an asymmetrically signed, one way encryption cypher text value, such as a cryptographic hash, of the ticket file in the wagering system to validate that the wagering system generated the ticket file; and a means of transmitting the ticket file to the player.

It thus is seen that an electronic ticket is provided that overcomes the problem of ticket verification of the past. Although the new electronic ticket has been shown in its preferred form, many modifications, additions and deletions, in addition to those expressly recited herein, may be made thereto without departure from the spirit and scope of the invention as set forth in the following claims.

The invention claimed is:

1. An anonymous electronic bearer instrument comprising an electronic file containing a humanly detectable first dataset that contains a humanly undetectable second dataset, said humanly undetectable second dataset containing claim validation information being selected by or for a claimant and encrypted using a cryptographic key known only to an authority, said humanly undetectable second dataset including said claim validation information also being encoded into the humanly detectable first dataset the resulting electronic file including said claim validation information and being transferred from the authority to the claimant, said humanly undetectable second dataset being undetectable to the claimant.

2. The electronic bearer instrument of claim 1 wherein said electronic file is an image file.

3. The electronic bearer instrument of claim 1 wherein said electronic file is an audio file.

4. The electronic bearer instrument of claim 1 wherein said electronic file is a video file.

5. The electronic bearer instrument of claim 1 wherein said electronic file does not contain personal identification information.

6. The electronic bearer instrument of claim 1 wherein said electronic file contains personal identification information.

7. The electronic bearer instrument of claim 1 wherein a cryptographic signature of a cryptographic hash of said electronic file is stored by a shopping or wagering management system and said cryptographic signature of said cryptographic hash acts as an indicator of authenticity.

8. The electronic bearer instrument of claim 1 wherein said claim validation attributes includes the credentials of more than one claimant.

9. The electronic bearer instrument of claim 8 wherein said electronic file may be possessed by each of said more than one claimant.

10. The electronic bearer instrument of claim 1 wherein said cryptographic key is a symmetric key.

11. The electronic bearer instrument of claim 10 wherein said symmetric key is encrypted with an asymmetric public key with a corresponding asymmetric private key known by said shopping or wagering management system.

12. The electronic bearer instrument of claim 11 wherein said encrypted symmetric key is included in said humanly undetectable second dataset.

13. An anonymous electronic bearer instrument comprising an electronic file transmittable in a lossless fashion, said electronic file including a final group of bytes derived from a first group of bytes and a second group of bytes, said second group of bytes being encrypted with a cryptographic key known only to a bearer instrument issuing authority, said second group of bytes containing wager information being selected by or for a claimant, said second group of bytes being encoded into said first group of bytes by changing one or more bits of one or more bytes of said first group of bytes resulting in the formation of said final group of bytes without significantly altering by comparison the auditory or visual presentation of the anonymous electronic bearer instrument represented by and between said first group of bytes and said final group of bytes, the resulting final electronic file containing said wager information being transferred from the issuing authority to the claimant, said second group of bytes being undetectable to the claimant of said anonymous electronic bearer instrument.

14. The electronic bearer instrument of claim 13 wherein said electronic file is an image file.

15. The electronic bearer instrument of claim 13 wherein said electronic file is an audio file.

16. The electronic bearer instrument of claim 13 wherein said electronic file is a video file.

17. The electronic bearer instrument of claim 13 wherein said electronic file does not contain personal identification information.

18. The electronic bearer instrument of claim 13 wherein said electronic file contains personal identification information.

19. The electronic bearer instrument of claim 13 wherein a cryptographic signature of a cryptographic hash of said electronic file is stored by a shopping or wager management system.

20. The electronic bearer instrument of claim 13 wherein said claim validation attributes includes the credentials of more than one claimant.

21. The electronic bearer instrument of claim 20 wherein said electronic file may be possessed by each of said more than one claimant.

22. The electronic bearer instrument of claim 13 wherein said cryptographic key is a symmetric key.

23. The electronic bearer instrument of claim 22 wherein said symmetric key is encrypted with an asymmetric public key with a corresponding asymmetric private key known by said shopping or wager management system.

24. The electronic bearer instrument of claim 23 wherein said encrypted symmetric key is included in said humanly undetectable second dataset.

* * * * *